United States Patent
Kistner

(10) Patent No.: US 7,588,378 B2
(45) Date of Patent: Sep. 15, 2009

(54) CAMERA TRIPOD HEAD WITH WEIGHT COMPENSATION

(75) Inventor: Bernhard Kistner, Munich (DE)

(73) Assignee: Camera Dynamics GmbH, Eching (DE)

( * ) Notice: Subject to any disclaimer, the term of this patent is extended or adjusted under 35 U.S.C. 154(b) by 364 days.

(21) Appl. No.: 10/579,371

(22) PCT Filed: Oct. 20, 2004

(86) PCT No.: PCT/EP2004/011882

§ 371 (c)(1),
(2), (4) Date: Mar. 29, 2007

(87) PCT Pub. No.: WO2005/047971

PCT Pub. Date: May 26, 2005

(65) Prior Publication Data

US 2007/0172228 A1    Jul. 26, 2007

(30) Foreign Application Priority Data

Nov. 13, 2003 (DE) ................................. 103 53 004

(51) Int. Cl.
*G03B 17/00* (2006.01)
*F16M 11/02* (2006.01)

(52) U.S. Cl. .................. 396/428; 396/419; 396/429; 396/5; 348/373; 248/177.1; 248/372.1; 248/292.13; 248/183.3

(58) Field of Classification Search ........................ None
See application file for complete search history.

(56) References Cited

U.S. PATENT DOCUMENTS

| | | | |
|---|---|---|---|
| 4,757,970 A * | 7/1988 | Nakazawa et al. | 248/571 |
| 4,771,979 A * | 9/1988 | Nakazawa et al. | 248/578 |
| 5,413,295 A * | 5/1995 | Ishikawa | 248/183.2 |
| 5,605,101 A * | 2/1997 | Lindsay | 108/7 |
| 6,364,275 B1 * | 4/2002 | Lindsay | 248/648 |
| 6,857,794 B2 * | 2/2005 | Jaumann | 396/428 |
| 7,287,731 B2 * | 10/2007 | Johnson | 248/183.3 |
| 7,296,778 B2 * | 11/2007 | Lindsay | 248/648 |
| 7,533,856 B2 * | 5/2009 | Mollenhauer | 248/177.1 |
| 2004/0016857 A1 * | 1/2004 | Jaumann | 248/177.1 |
| 2004/0206863 A1 * | 10/2004 | Tillschneider | 248/177.1 |
| 2005/0023424 A1 * | 2/2005 | Chow et al. | 248/292.11 |
| 2005/0156091 A1 * | 7/2005 | Lindsay | 248/371 |

FOREIGN PATENT DOCUMENTS

| | | |
|---|---|---|
| DE | 27 17 772 B1 | 10/1978 |
| DE | 30 26 379 A1 | 2/1982 |
| DE | 37 39 080 A1 | 5/1989 |
| DE | 39 08 682 A1 | 10/1990 |
| DE | 694 23 750 T2 | 2/1996 |
| GB | 2 080 406 A | 2/1982 |
| GB | 2 231 548 A | 11/1990 |

* cited by examiner

*Primary Examiner*—Melissa J Koval
*Assistant Examiner*—Bret Adams
(74) *Attorney, Agent, or Firm*—Wolf, Greenfield & Sacks, P.C.

(57) ABSTRACT

A camera-support head includes a stator and a rotor that is mounted so that it can be rotated about an inclined axis in relation to the stator. The head also includes a compensation device for compensating a load torque that occurs during the inclination, the device having an energy accumulator which exerts a restoring torque on the rotor during the inclination. In addition, the compensation device has an auxiliary device which influences the transmission of the rotational displacement from the rotor to the energy accumulator and thus also the restoring torque that is exerted on the rotor by the energy accumulator.

11 Claims, 4 Drawing Sheets

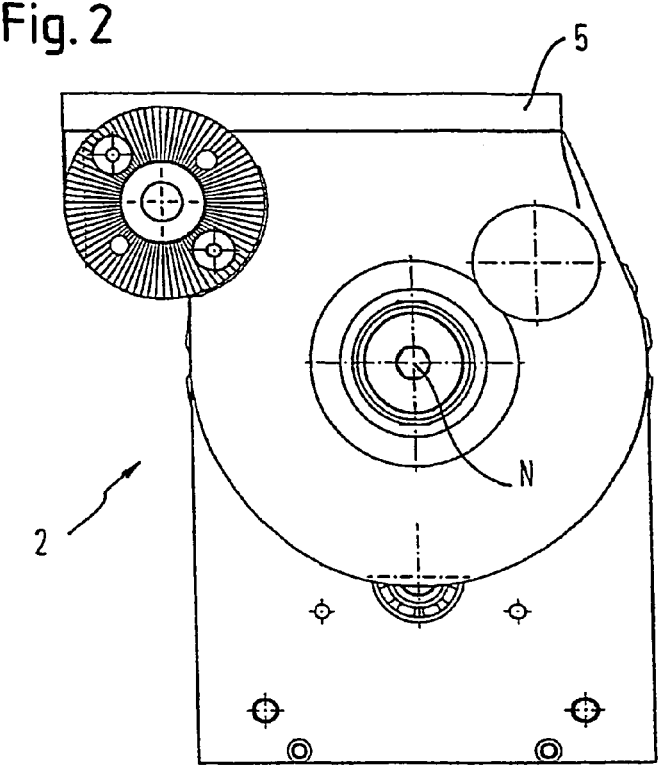
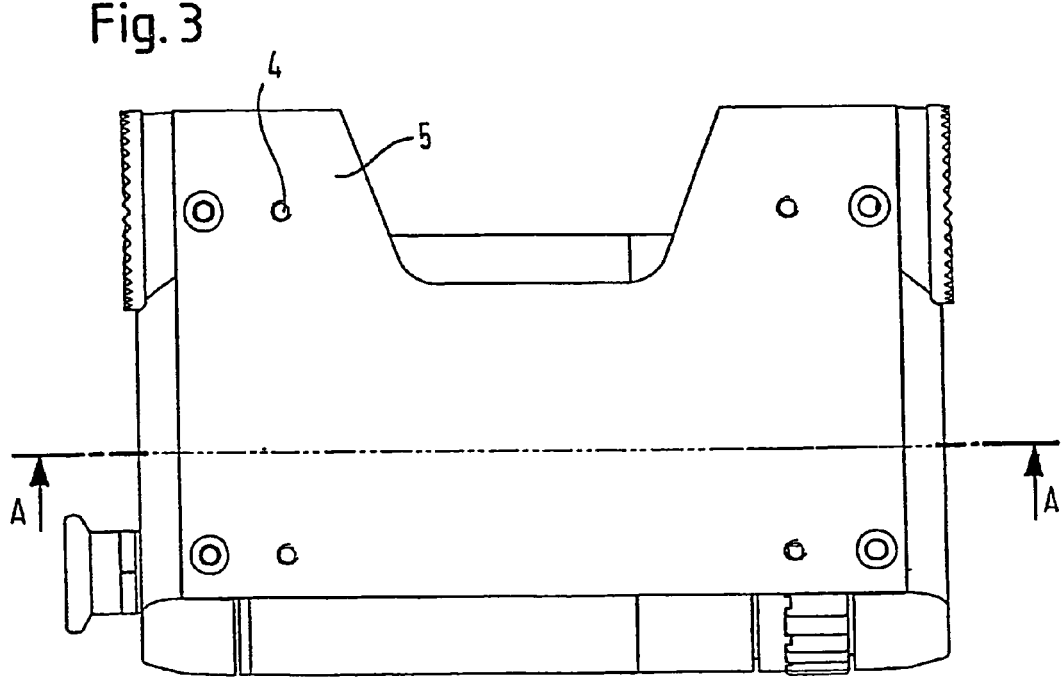

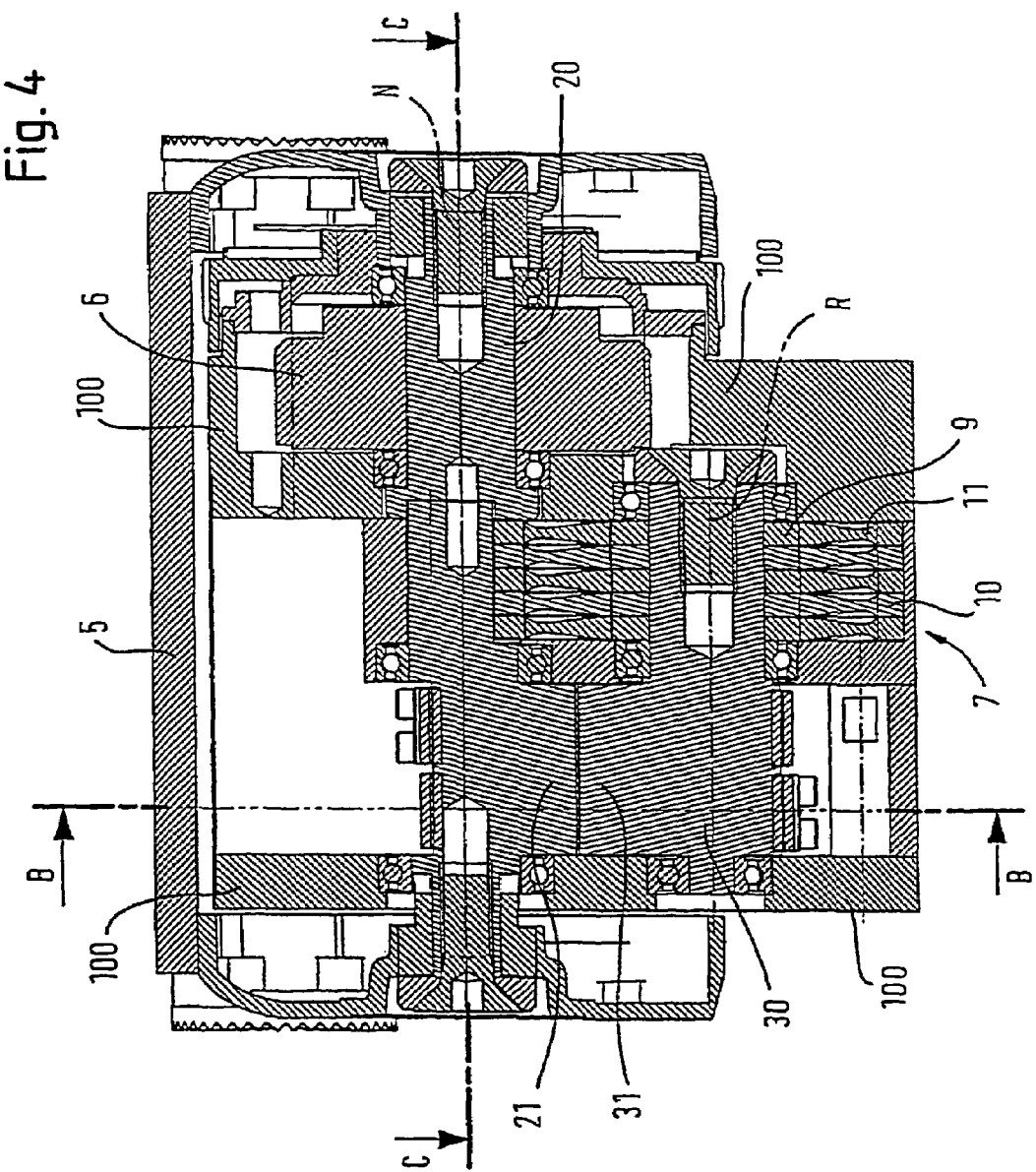

CAMERA TRIPOD HEAD WITH WEIGHT COMPENSATION

FIELD OF THE INVENTION

The present invention relates to a camera tripod head with a device for compensation of a weight moment arising during a tilting movement.

Such tripod heads are used, for example, on camera tripods or pedestals. Cameras that cannot be handheld—for example, because of their weight or size or because of special requirements in terms of smooth camera movement—rest on such a camera tripod or camera pedestal. In this regard the camera is supported on a camera tripod head, which is rotatable about a horizontal axis (tilt axis) and a vertical axis (swivel axis), to enable the cameraman to follow moving objects with the camera's object lens. (In the following, solely the term "camera tripod" will be used; however, the descriptions apply equally to camera pedestals). When tilting the camera, i.e. when rotating the tripod head about its tilt axis, the distance between the camera's center of gravity from this tilt axis (height of center of gravity) together with the camera's force of gravity, generates a turning moment about the tilt axis that depends on the tilt angle.

The weight compensation device should permit force-free tilting of the camera by compensating for this tilt moment. It is necessary for this weight compensation to be rapidly and easily adjustable for different weights and different heights of the center of gravity, because of the immediate change in the load moment when attaching different cameras or even other devices such as monitors or camera accessories such as teleprompters, etc.

In addition, the weight compensation should hold the camera directly in every tilt position without any subsequent movement, within a tilt range of at least ±90°, to enable the entire spatial field of view to be covered when tilting the camera.

PRIOR ART

As regards the weight compensation, it is known for example to compensate the tilt moment with a plurality of rubber disc torsion springs disposed one behind the other on the tilt axis (cf. e.g. DE 30 26 379). Here, the weight compensation can be adapted by engaging or disengaging individual disc torsion springs.

The advantages of such disc torsion springs is that they have a good ratio of weight to performance and installation space, i.e. good ability to store energy without having any great weight or requiring a lot of installation space.

If the center of gravity of the apparatus, e.g. the camera, attached to the tripod head is situated absolutely perpendicular above the tilt axis at a tilt angle of 0°, then when the camera is tilted, the tilt moment has a sinusoidal characteristic curve. However, the characteristic curve (moment of rotation over angle of rotation) of the known disposal with disc torsion springs is roughly linear with the result that although it roughly matches the sinusoidal characteristic curve of the tilt moment within a tilt range of 0° to around 45°, at tilt angles >45° it increasingly deviates from this characteristic curve. Therefore, the compensation moment with large tilt angles is too high and results in a subsequent movement backwards in the direction of the compensating position.

DESCRIPTION OF THE INVENTION

The object of the present invention is to create a tripod head with a device for compensating a weight moment that occurs during a tilt movement, said device compensating for the tilt moment more accurately, wherein the tripod head and in particular the compensating device is simultaneously capable of extremely compact design.

This object is solved according to the invention by a tripod head with the characteristics of Claim 1.

Accordingly, the tripod head has a stator and a rotor, which is rotatable around a tilt axis in relation to the stator, as well as a compensating device for compensation of a weight moment arising during a tilt movement of the rotor, said device having an energy storage device, which exerts a restoring moment on the rotor during the tilt movement. According to the invention, the compensating device moreover has an auxiliary device, which brings about the transmission of the rotational movement from the rotor to the energy storage device and thus also influences the restoring moment exerted on the rotor by means of the energy storage device.

This means that the tilt moment is compensated considerably more accurately than with the conventional disposal which merely has the rotor and disc torsion springs as energy storage device disposed between this rotor and the stator, whereby the rotational movement of the rotor is transmitted unchanged to the energy storage device.

In an especially preferred embodiment of the invention, the rotor and the auxiliary device are linked to each other and to the energy storage device such that the restoring moment exerted on the rotor by means of the energy storage device is influenced by the auxiliary device such that the restoring moment changes essentially sinusoidally with the tilt angle.

The restoring moment generated by the energy storage device then has a curve which corresponds exactly to the curve of the weight moment of the camera when tilted around the tilt axis: when the camera's center of gravity is exactly perpendicular above the tilt axis, the energy storage device does not generate any restoring moment or compensation moment. On tilting the camera from the resting position, the tilt moment generated by the camera's weight increases sinusoidally as the tilt angle increases, and at the same time the compensation moment generated by the energy storage device also increases sinusoidally. Thus the tilt moment is compensated at every tilt angle by a counter moment of exactly equal size with the result that the apparatus, e.g. the camera, on the tripod head is held in equilibrium in every tilt position. The cameraman then requires only very little force to tilt the camera in both directions and the camera automatically remains stationary at every tilt angle, i.e. always retains the tilt position.

The auxiliary device of the camera tripod head according to the invention is designed for this purpose in such a way that it influences the characteristic curve of the restoring moment (restoring moment over angle of rotation) generated by the energy storage device itself, said curve being roughly linear, such that the characteristic curve of the restoring moment generated by the compensating disposal as a whole substantially matches the sinusoidal characteristic curve of the tilt moment over the entire tilt range of ±90°—thus especially at tilt angles of >45°. Therefore, the tilt moment is compensated so accurately even with large tilt angles that there is no subsequent movement of the camera backwards in the direction of the compensating position.

With the tripod head according to the invention, the curve of the compensation moment thus corresponds to the curve of the tilt moment when tilting the camera over the entire range of at least ±90° with the result that the camera can be tilted as free from force at large tilt angles as at small tilt angles and, even at large tilt angles, automatically remains stationary in any desired position without subsequent movement.

In an advantageous further development of the invention, the compensating device may have means for transmitting the rotational movement of the rotor to the auxiliary device. In this regard the device for influencing the restoring moment may especially have a shaft likewise pivoted around an axis in relation to the stator and means for transmitting the rotational movement of the rotor to the shaft with the result that during the tilt movement the restoring moment exerted on the rotor by means of the energy storage device is influenced by the rotation of the shaft around its axis.

The energy storage device may have at least one outer ring lockable with the stator, e.g. with friction fit or positive fit, and at least one inner ring concentric thereto locked on the device for influencing the restoring moment, likewise e.g. with friction fit or positive fit, and at least one spring element disposed between them. The at least one spring element may be a torsion spring, for example a spiral spring, a disposal of inversely wound spiral springs or a spring of rubber elastic material such as rubber, vulcanized rubber, plastic or composite materials. Disc torsion springs are created by inserting these spring elements between an inner ring and an outer ring in each case.

The energy storage device of the compensating device may be divided up into a plurality of independent units—especially into a plurality of independent disc torsion springs—which can optionally be inserted either singly or in combination with each other in active engagement between the stator and the device for influencing the restoring moment, namely according to the weight of the apparatus used, i.e. a film or television camera for example. This makes it possible to adjust the restoring moment of the compensating device over a broad weight range by appropriately adjusting the restoring force of each energy storage device in combination with the interlocking facilities of these energy storage devices.

Thus, it is possible to adapt the compensating device accurately to cameras with any weight and any center of gravity whereby camera lens combinations including accessories may have a weight of up to 100 kg and a center of gravity of up to 25 cm. In the case of teleprompters and further camera accessories, which can likewise be mounted on the camera tripod head according to the invention, there may be weight and lever ratios which deviate therefrom; even the weight moment arising due to such superstructures can be compensated by the compensating device according to the invention for weight compensation.

A step-down and/or step-up gear, for example, may be provided to transmit the rotation of the rotor to the auxiliary device. In an advantageous embodiment there is a roll contact gear which is formed by a roll contact area of the rotor and a roll contact area of the device for influencing the restoring moment.

This desired sinusoidal characteristic curve of the restoring moment may be achieved by appropriately designing the cross-section of those areas of both rotors which roll off one another. The optimum cross-section shapes may be obtained from calculations which persons skilled in the art can perform against the background of the present teachings.

Alternatively or additionally, at least one band or belt may be provided to transmit the rotation of the rotor to the device for influencing the restoring moment. Preferably two bands or belts are provided to transmit the rotation of the rotor to the device for influencing the restoring moment in one tilt direction in each case. Joining of the bands or belts to the two rotors is by means of positive and/or friction fit. The bands or belts may be made of steel or of other appropriate materials.

Finally, to enable gentle tilting movements, the tripod head may in addition have a damping device independent of the compensating device, also adjustable if possible.

BRIEF DESCRIPTION OF THE DRAWINGS

Embodiments of the invention will be described in greater detail in the following with reference to the drawings enclosed. In particular:

FIG. 2 shows a view of a tripod head according to the invention from the side, FIG. 3 shows a top view onto the tripod head according to the invention, FIG. 4 shows a sectional view along the line A-A in FIG. 3.

DETAILED DESCRIPTION OF A PREFERRED EMBODIMENT

Figure 1:
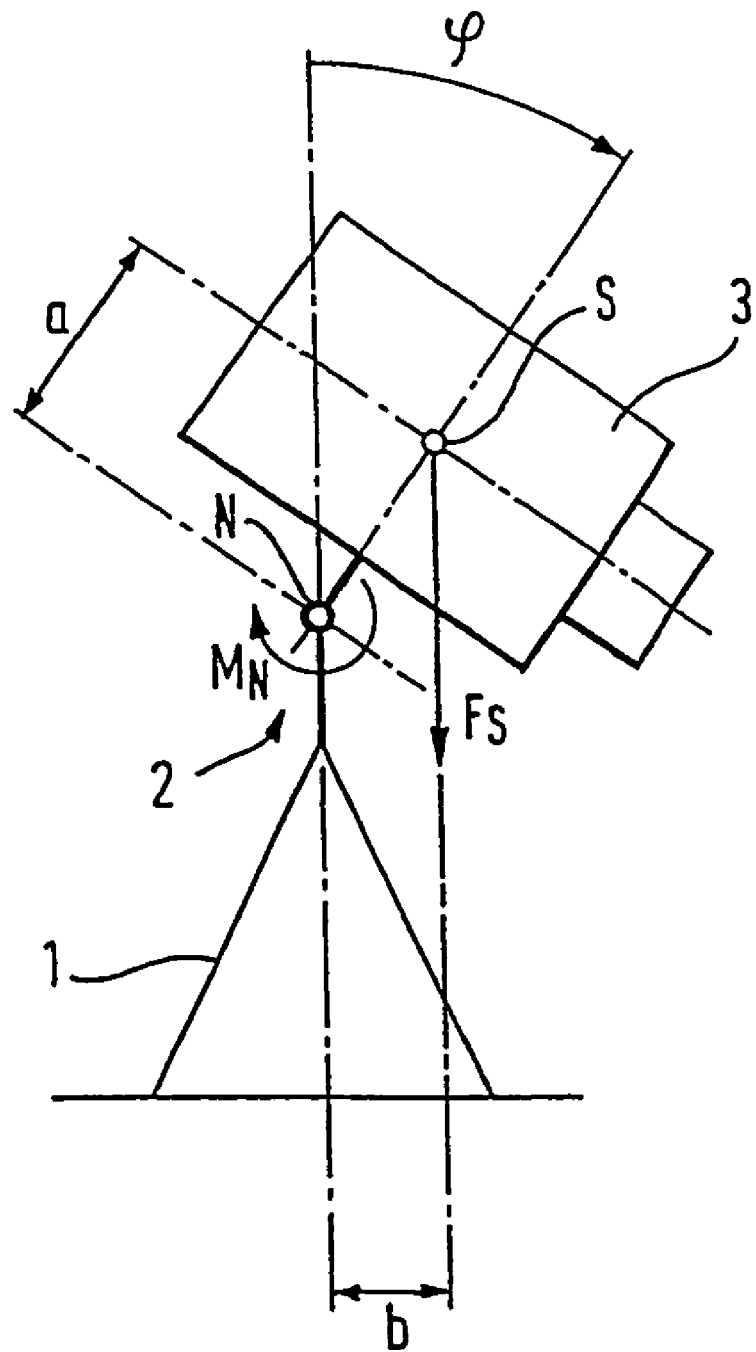
FIG. 1 shows a schematic view of a camera tripod with a tripod head and a camera attached thereto.

FIG. 1 shows a schematic view of a camera tripod 1 with a tripod head 2 and a camera 3 mounted thereon. The camera is deflected by tilt angle $\phi$ by comparison with its balanced position, in which its center of gravity S is exactly vertical above tilt axis N running perpendicular to the plane of the drawing. Due to the distance of the center of gravity a of the camera's center of gravity from tilt axis N, a lever arm $b = a \sin \phi$ arises, which together with weight $F_s$ of the camera brings about a tilt moment M around tilt axis N. With increasing angle $\phi$, tilt moment $M = F_s a \sin \phi$ increases sinusoidally.

FIGS. 2 to 5 show different views of an embodiment of a tripod head 2 according to the invention.

Figure 5:
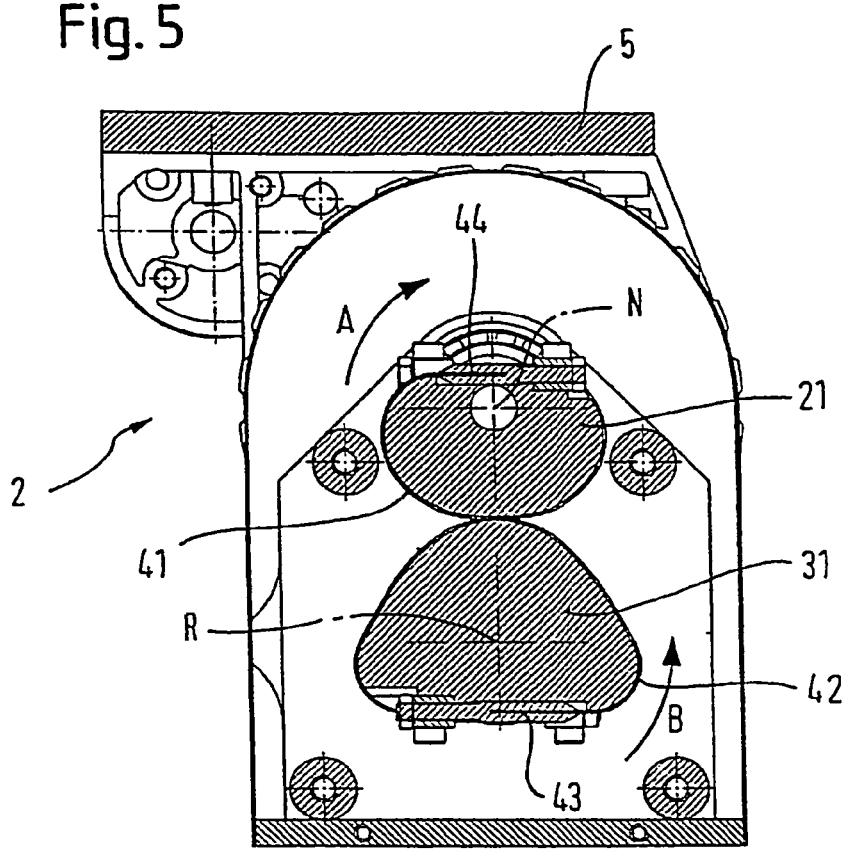
FIG. 5 shows a sectional view along the line B-B in FIG. 4.
Figure 6:
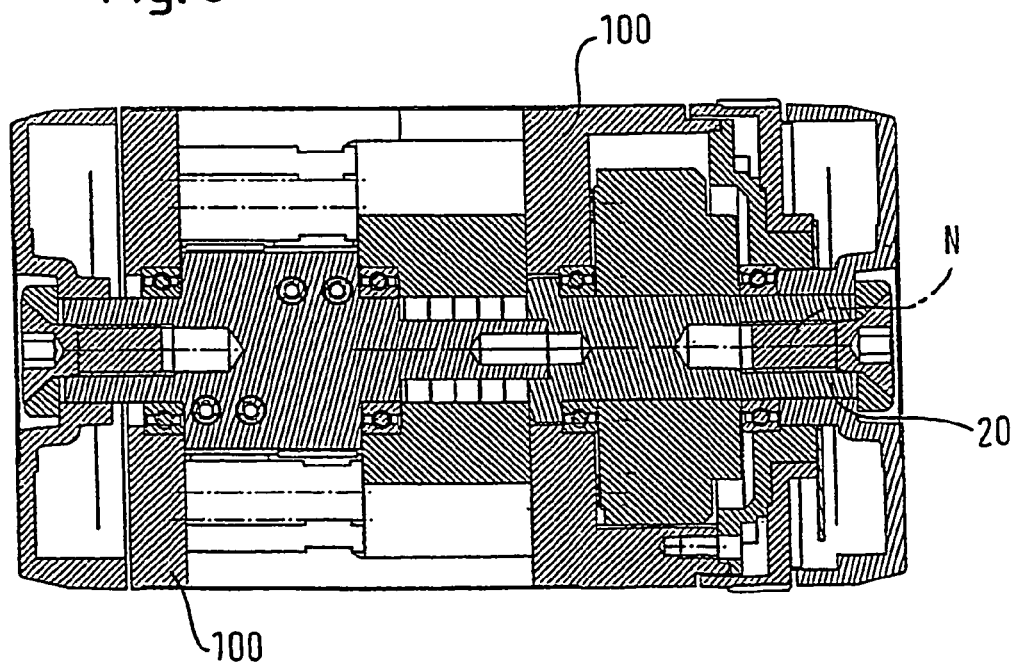
FIG. 6 shows a sectional view along the line C-C in FIG. 4.

From a synopsis of FIGS. 4 and 5 it becomes obvious that the tripod head according to the invention has a stator 100 as well as a rotor 20 and a shaft 30, both of which are pivotable in relation to the stator, by way of roller bearings in the embodiment illustrated.

On the top side of tripod head 2 can be seen a retainer 5 in which holes 4 are formed (cf. FIG. 3). On this retainer 5 it is possible by means of holes 4 to attach a camera retaining plate (not shown) for example on top of tripod head 2, on which then a camera (likewise not shown) can be mounted, preferably movably.

In this case rotor 20 is permanently coupled to retainer 5 for the camera and when the camera is tilted around tilt axis N, rotor 20 executes a rotation around tilt axis N in relation to stator 100.

As can be seen in particular from the sectional view in FIG. 4, a device 6 for damping of this tilt movement, i.e. of this rotation of rotor 20 in relation to stator 100, is provided in tripod head 2 according to the invention. The intention is not to describe the design of this frictionless damping device 6 in greater detail here; it may be any of the appropriate damping devices known in this field.

In addition, tripod head 2 according to the invention has a device 7 for weight compensation. This compensating device 7 compensates the tilt moment arising during the tilting movement of rotor 20, for example, due to the weight of a camera and thus enables force-free tilting of said camera.

Energy storage device 7, which can be seen in the sectional view in FIG. 4, corresponds in respect of its structure substantially to the known energy storage device described initially. However, it is disposed inside tripod head 2 according to the invention in a different manner in order to match the restoring moment generated more accurately to the tilt moment as will be described in greater detail in the following.

Energy storage device 7 has a plurality of disc torsion springs 8 each with an inner ring 9 and an outer ring 10. Inner rings 9 are pushed onto shaft 30 and locked in place there in a manner known per se. For this purpose they may, for example, each have a nib which engages in a correspondingly shaped groove in shaft 30 and locks the inner ring in position torque-proof vis-a-vis said shaft.

Outer rings 10 may be coupled individually to stator 100 so as to be detachable. For this purpose, each outer ring 10 may have, for example, an indentation in its outer surface by way of which outer ring 10 can be joined to stator 100 by means of a locking element. In this case a small gap remains between outer rings 10 and stator 100 with the result that outer rings 10 can be twisted about stator 100 when the locking device is not active. Each disc torsion spring 8 may be locked with stator 100 independently of the others.

Between inner ring 9 and outer ring 10 of each disc torsion spring 8 is provided a spring element 11, in this case a rubber ring. Joining of rubber ring 11 to the inner ring and outer ring is carried out, for example, during vulcanization by means of chemical or physical processes. Such techniques for joining metal and rubber or other elastic materials are known in the art.

Rotor 20 and shaft 30 are linked together according to the invention such that the rotation of rotor 20 just referred to on tilting of the camera around tilt axis N also brings about a rotation of shaft 30 around its axis R.

This coupling is realized here in that a roll contact area 21 and 31 is formed on rotor 20 and shaft 30 respectively; these two roll contact areas 21, 31 form a roll contact gear. However, roll contact areas 21, 31 do not roll directly off one another during rotation of rotor 20 around tilt axis N in this embodiment and thus bring about the rotation of shaft 30 around its axis R although this would be possible. In fact, to transmit the rotational movement from rotor 20 to shaft 30, two bands or belts are provided, in this case in the form of steel bands 41, 42 (cf. FIG. 5). First steel band 41 runs from an attachment point 44 at the top on rotor 20 in the shape of an S around rotor 20 and shaft 30 up to an attachment point 43 at the bottom on shaft 30. Second steel band 42 runs parallel to the plane of the drawing, displaced by its width, from attachment point 44 at the top on rotor 30 on the mirror-inverted path, i.e. in the shape of a question mark, around rotor 20 and shaft 30 up to attachment point 43 at the bottom on shaft 30.

Two steel bands 41, 42 form together with roll contact areas 21, 31 a flush-fitting roll contact gear which basically behaves like a toothed gear with infinitely fine toothing.

In the ideal case, steel bands 41, 42 have no free cable length. Steel bands 41, 42 are braced against each other such that the entire disposal is tolerance-free. The gap between roll contact areas 21, 31 of rotor 20 and shaft 30 always remains constant during rotation.

By means of tripod head 2 according to the invention, the tilt moment arising on tilting of the camera is compensated as follows:

At least some of outer rings 10 of disc torsion springs 8 are locked in relation to the stator. If retainer 5 together with rotor 20 is now twisted towards the right in FIG. 5 (arrow A) for tilting of the camera, steel bands 41, 42 bring about a rotation of shaft 30 around its axis R, namely in the opposite direction of rotation (arrow B). As a result, inner rings 9 of disc torsion springs 8 pushed onto shaft 30 are twisted compared with outer rings 10 locked in stator 100.

Here, first steel band 41 attached at 44 on rotor 20 brings about transmission of the rotational movement from rotor 20 to shaft 30 by "pulling" on shaft 30 by way of its attachment at 43. Second steel band 42 on the other hand plays no part in this tilt direction.

As a result of twisting disc torsion springs 8 due to their coupling with shaft 30, onto which the rotational movement of rotor 20 is transmitted by way of roll contact gear 21, 31, compensating of the tilt moment is considerably more accurate than with the conventional disposal with only one rotor and disc torsion springs disposed between this rotor and the stator, in which the rotation of the rotor is transmitted directly, i.e. 1:1, to the energy storage device.

By calculating an appropriate cross-sectional shape of roll contact areas 21, 31 of rotor 20 and shaft 30, it is possible to optimize the compensation moment generated such that it essentially corresponds to the ideal sinusoidal characteristic curve. Then the actual tilt moment occurring is compensated accurately in every tilt position. The advantages of using disc torsion springs (good weight to performance ratio, good performance to use of space) are maintained.

The disposal according to the invention thus also enables tilting of the camera in the opposite direction: if retainer 5 together with rotor 20 is twisted towards the left in FIG. 5 (opposite direction to arrow A) for tilting of the camera, second steel band 42 attached at 44 on rotor 20 brings about transmission of the rotational movement from rotor 20 to shaft 30 by "pulling" on shaft 30 by way of its attachment on 43 of shaft 30. First steel band 41 on the other hand plays no part in this tilt direction.

In the opposite direction too, as a result of twisting disc torsion springs 8 due to their coupling with shaft 30, onto which the rotational movement of rotor 20 is transmitted by way of roll contact gear 21, 31, compensation of the tilt moment is considerably more accurate than with the conventional disposal with only one rotor and disc torsion springs disposed between this rotor and the stator, in which the rotation of the rotor is transmitted directly, i.e. 1:1, to the energy storage device.

In the embodiment just described, outer rings 10 of disc torsion springs 8 are lockable in relation to the stator; however, it is also conceivable to dispose them such that during a tilting movement of the rotor they are likewise deflected and this brings about an additional or a reduced twisting of the disc torsion springs.

Finally, in the embodiment presented, axis R of shaft 30 runs parallel to tilt axis N but offset in relation to it. However, it is also possible to provide a concentric disposal.

By appropriately selecting and combining the restoring moments delivered by the individual disc torsion springs, it is possible with the weight compensating device according to the invention to compensate pivot moments of apparatus, such as film or television cameras of varying weights, over a wide range whereby the restoring moment generated by the compensating device compensates the tilt moment within the entire tilt range of at least ±90° more accurately than in weight compensating devices known to date.

The invention claimed is:

1. Tripod head with a stator and a rotor, which is rotatable around a tilt axis in relation to the stator, as well as a compensating device for compensation of a weight moment arising during a tilt movement of the rotor, said device having an energy storage device, which exerts a restoring moment on the rotor during the tilt movement, wherein the compensating device has an auxiliary device, which brings about the transmission of the rotational movement from the rotor to the energy storage device and thus also influences the restoring moment exerted on the rotor by means of the energy storage device, and which has a shaft likewise pivoted around an axis in relation to the stator and means for transmitting the rotational movement of the rotor to the shaft with the result that during the tilt movement the restoring moment exerted on the rotor by means of the energy storage device is influenced by the rotation of the shaft around its axis, and wherein the auxiliary device has a roll contact gear which is formed by a roll contact area of the rotor and a roll contact area of the auxiliary device whereby the shape of the cross-section of these roll contact areas is optimized such that the restoring moment changes essentially sinusoidally with the tilt angle.

2. Tripod head according to claim 1, in which the energy storage device has at least one adjustable outer ring lockable with the stator as well as at least one inner ring concentric thereto locked with the auxiliary device and at least one spring element disposed between.

3. Tripod head according to claim 2, in which the at least one spring element is a torsion spring.

4. Tripod head according to claim 3, in which the spring element between inner ring and outer ring is a spiral spring.

5. Tripod head according to claim 3, in which the spring element between inner ring and outer ring is a rubber ring.

6. Tripod head according to claim 1, in which the energy storage device is divided into a plurality of independent units, which can optionally be inserted either singly or in combination with each other in active engagement between the stator and the auxiliary device.

7. Tripod head according to claim 1, in which the auxiliary device has a step-down and/or step-up gear to transmit the rotation of the rotor to the shaft.

8. Tripod head according to claim 1, in which at least one band is provided to transmit the rotation of the rotor to the auxiliary device, said band being attached at one end on the rotor and at the other end on the auxiliary device and running around at least one area of the rotor and the auxiliary device.

9. Tripod head according to claim 8, in which the at least one band in combination with the roll contact gear is provided to transmit the rotation of the rotor to the auxiliary device.

10. Tripod head according to claim 8, in which two bands are provided to transmit the rotation of the rotor to the auxiliary device in one tilt direction in each case.

11. Tripod head according to claim 1, in which a device for damping the tilt movement is provided in addition.

* * * * *